United States Patent [19]

Slavens

[11] 4,253,599
[45] Mar. 3, 1981

[54] PIPE WELDING CLAMP INCLUDING PIPE END SPACING MEANS

[75] Inventor: Clyde M. Slavens, Houston, Tex.

[73] Assignee: Midcon Pipeline Equipment Co., Houston, Tex.

[21] Appl. No.: 61,488

[22] Filed: Jul. 27, 1979

Related U.S. Application Data

[63] Continuation-in-part of Ser. No. 875,913, Feb. 7, 1978, abandoned.

[51] Int. Cl.³ .............................................. B23K 37/04
[52] U.S. Cl. ............................... 228/49 B; 33/164 R; 228/56.5; 269/48.1
[58] Field of Search .............. 228/49 B, 49 R, 56.5; 269/48.1; 33/164 R

[56] References Cited

U.S. PATENT DOCUMENTS

| | | | |
|---|---|---|---|
| 279,038 | 6/1883 | Stillman | 33/164 R |
| 2,565,140 | 8/1951 | Levstig | 33/164 R |
| 3,259,964 | 7/1966 | Engel | 228/49 B |
| 3,699,635 | 10/1972 | Bradley | 269/48.1 |
| 3,937,382 | 2/1976 | Cunningham et al. | 228/49 B |
| 3,979,041 | 9/1976 | Kaneyama et al. | 228/49 B |

*Primary Examiner*—Kenneth J. Ramsey
*Attorney, Agent, or Firm*—Carl B. Fox, Jr.

[57] ABSTRACT

Pipe welding clamp including pipe end spacing means, for holding pipes disposed end to end for welding, and for spacing the pipe ends apart by a small distance during welding. Two clamp assemblies are provided, one for each pipe end, the clamp assemblies being individually expanded and set by forces applied through axially movable sleeve assemblies and toggles connected between the sleeve assemblies and radially disposed clamp elements. The sleeves are moved for setting and retracting the clamp assemblies by fluid cylinders. An additional fluid cylinder is adapted to move one clamp assembly relative the other to provide spacing between the pipe ends after setting of the clamps, the pipe end spacing being controlled at circularly spaced points around the apparatus by screw-adjustable spacing stops.

8 Claims, 3 Drawing Figures

PIPE WELDING CLAMP INCLUDING PIPE END SPACING MEANS

This application is a continuation-in-part of application Ser. No. 875,913, filed Feb. 7, 1978, now abandoned.

BACKGROUND OF THE INVENTION

Several types of pipe welding clamps have been used in the art for clamping together pipe ends for welding. Clamps of the general type herein disclosed and claimed have been used in the art, wherein axially movable members are connected to radially movable clamps by toggle linkages. But in such devices, no adequate means for spacing of the pipe ends for welding has been supplied. This apparatus provides a pipe end spacing means wherein the pipe spacing is controlled at circularly spaced points adjacent the pipe walls so that the pipe spacing is accurate around the entire peripheries of the pipes.

SUMMARY OF THE INVENTION

The invention affords a pipe welding clamp including pipe end spacing means wherein separate sets of pipe clamps are provided for the two pipe ends, the clamps being expanded by axially movable members which are separately driven so that the clamps in each pipe end may be expanded and set separately. In a novel construction, a central shaft is provided on which the two clamp setting members are slidably disposed, and the apparatus provides a fluid cylinder drive assembly to provide small axial movement of the central shaft in a pipe end spacing direction whereby one of the pipe clamps is axially moved to space the pipe ends. The extent of pipe end spacing movement of the clamp which is moved is limited by adjustable stops on shafts affixed to the other clamp, these being located adjacent the pipe walls at circularly spaced points, so that the pipe end spacing is accurately controlled at circularly spaced points around the pipe wall whereby the pipe end spacing is accurate around the entire pipe periphery.

A principal object of the invention is to provide a pipe welding clamp including pipe end spacing means. Another object of the invention is to provide such a pipe welding clamp having pipe end spacing means wherein the pipe ends are spaced accurately. A further object of the invention is to provide such apparatus wherein the pipe end spacing is accomplished by relative movement of one of the pipe end clamps along a central shaft. Yet another object of the invention is to provide such apparatus wherein the movement of one of the clamps is accomplished through use of a fluid cylinder. Another object of the invention is to provide such apparatus wherein the extent of pipe end spacing is limited by screw adjustable stop means disposed at circularly spaced points adjacent the periphery of the apparatus. A further object of the invention is to provide such apparatus which is simple in construction and operation, which is rugged and durable, and which is economical.

BRIEF DESCRIPTIONS OF THE DRAWINGS

DESCRIPTION OF THE PREFERRED EMBODIMENTS

Figure 1:
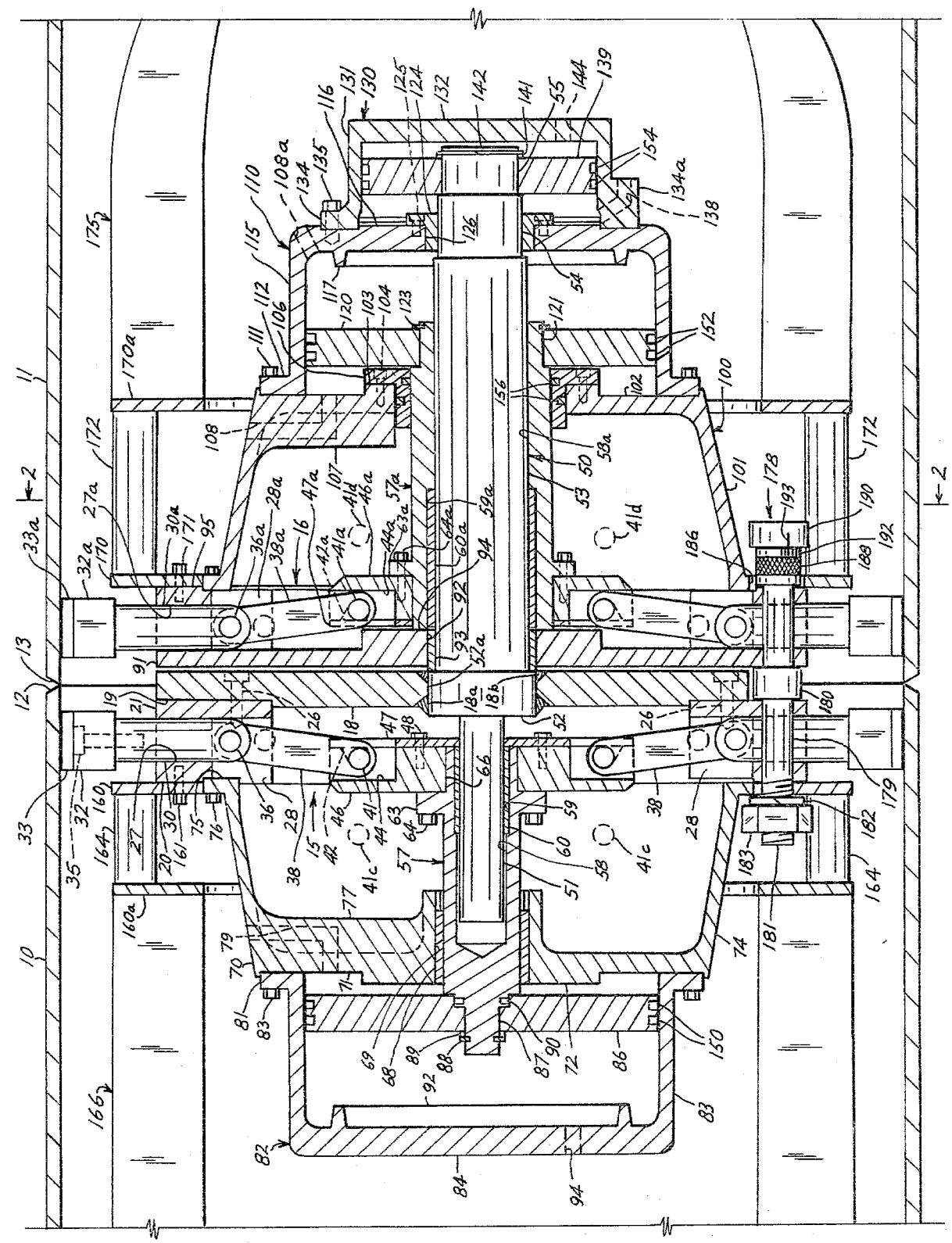
FIG. 1 is a vertical cross section taken along the axis of an apparatus of preferred form according to the invention.

Referring now to the drawings in detail, and to the preferred embodiment of apparatus according to the invention shown therein, pipes 10, 11 are shown abutted end to end at welding bevels 12, 13, respectively. The apparatus has two axially spaced clamp assemblies 15, 16, assembly 15 being shown clamped in the end of pipe 10, and assembly 16 being shown clamped in the end of pipe 11.

A plate 18 is of circular shape and has an annular recess 19 around its periphery at one side. A metal ring 20 has an inner periphery adapted to seat against the inner side of recess 19, and has an outer periphery 21 spaced from the wall of pipe 10 therearound. Ring 20 is fixed to plate 18 by a plurality of circularly spaced screws 26, only two being shown in FIG. 1. Ring 20 has a plurality of circularly spaced cylindrical passages 27 radially disposed therethrough. At the inner end of each passage 27 there is provided a widened recess 28 at one side of ring 20. A slidable cylindrical shaft 30 is disposed through each passageway 27 and each shaft 30 has affixed to its outer end a metal shoe 32 faced at its outer side by a pipe wall engaging pad 33. Each shoe 32 and pad 33 are assembled to one another and to a shaft 30 in conventional manner, usually by a screw 35 screwed into a tapped opening formed axially into the end of the shaft 30.

The inner end of each shaft 30 is slotted to form a yoke and a cross pin 36 is disposed through cylindrical holes at opposite sides of the yoke. The outer end of each of plural bars 38 has a cylindrical transverse opening through which a pin 36 is disposed. Each bar 38 forms a toggle, the inner end of each bar 38 being pivotally affixed by a transverse pin 41 disposed in opposite angular recesses 42 at each side of a recess opening 44 at one side of the periphery of a disc element 46. Each pin 41 is held in the opposite slots 42 by a plate 47 affixed by screws 48 to the face of disc 46 at which the recesses 44 are located.

An axial shaft 50 has a smaller diameter portion 51 at its left hand end, as shown in FIG. 1. To the right of portion 51, shaft 50 is enlarged at portion 52 and has a portion 53 of a diameter slightly smaller than the portion 52 at the right hand side thereof. Shaft 50 is reduced in diameter stepwise at right hand end portions 54, and 55. Plate 18 is securely welded to portion 52 of shaft 50 at 18a, 18b.

Fitting 57 has an axial bore 58 which is concentrically enlarged at 59 to receive a bushing 60. Portion 51 of shaft 50 is disposed within bore 58, seated therearound at bushing 60. Shaft portion 51 is axially movable in bore 58, being axially slidable through bushing 60. Fitting 57 has an enlarged ring portion 63 therearound to which disc 46 is affixed by a plurality of screws 64. Disc 46 has a central opening 66 of cylindrical shape snugly fitted around the right hand end of fitting 57.

The left hand part of fitting 57 is slidably received through a bushing 68 in the form of a cylindrical sleeve which is mounted in annular space 69 around an opening centrally through a housing member 70. Housing member 70 is annularly recessed at its end 71. End wall 72 of housing 70 has one end of frustoconical wall 74 integrally formed therewith, wall 74 having a circular flange 75 around its other end which is affixed by a plurality of circularly spaced screws 76 to the ring 20. Wall 72 of housing 70 is thickened at 77, in the form of a radial rib formation, to provide that a fluid passageway 79 may be formed therethrough, passage 79 being L-shaped. Flange 81 of cylinder housing 82 is connected therearound to housing 70 by screws 83, flange 81 being fitted within the outer portion of recess 71, as shown. Housing 82 has cylindrical sidewall 83 and circular transverse end wall 84. Piston 86 is fixed onto the reduced end portion 87 of fitting 57 by split ring 88 and washer 89. Shaft end 87 is stepped as shown in the drawing, and a suitable seal 90 is provided therearound. Wall 84 has inwardly projecting annular ring formation 92.

The clamp 15 at the left side of the apparatus as depicted in FIG. 1 is operated through operation of cylinder 82 and piston 86. A fluid-inlet-outlet passageway 94 is provided through end wall 84 of cylinder 82. Passage 79, heretofore described, serves as a fluid inlet-outlet to the other side of piston 86. Piston 86 may be moved to the right or to the left by suitable imposition of pressured fluid through passages 79, 94. When piston 86 is moved to the left by higher pressure at the righthand side of the piston, disc 46 is moved to the left to move pin 41 to position 41c and the toggles 38 connected thereto draw shafts 30 and shoes 32 inwardly. Opposite movement of piston 86 toward the right causes the toggles 38 to move shafts 30 and shoes 32 outwardly to engage the pipe wall. During these operations, the shaft 50 remains stationary and fitting 57 slides along bushing 60 as has been earlier mentioned.

Directing attention now to the right end portion of the apparatus as shown in FIG. 1, a shaped plate 91 has a circular central opening 92 through which is disposed sleeve shaped bushing 93. Bushing 93 is fitted about portion 53 of shaft 50, at the lefthand end thereof as shown. Plate 91 has thickened hub portion 94. Around its periphery, plate 91 has annular portion 95 formed by thickening of plate 91 at one side thereof. Formation 95 serves the same purpose as ring 20 of the lefthand portion of the apparatus. Plate portion 95 has cylindrical passages or bores 27a therethrough, radially disposed, in which shafts 30a are disposed. Shafts 30a have pipe engagement shoes 32a at their outer ends having pipe engaging pads 33a at their radially outer surfaces. Toggles 38a are pivotally connected as heretofore described to the inner ends of shafts 30a, the inner ends of the toggles 38a being pivotally connected to ring 46a in recesses 44a thereof by pins 41a disposed in opposite angular slots 42a and retained by plate 47a fixed by screws 38a to the lefthand side of ring 46a. Ring or disc 46a is disposed around a fitting 57a having outward ring formation 63a through which plural circularly spaced screws 64a are disposed to affix ring 64a to fitting 57a.

Sleeve bushing 60a is fitted within recess 59a of fitting 57a. Housing 100 has conically flared sidewall 101 and end wall 102. End wall 102 is thickened toward the right, FIG. 1, at its inner periphery at 103. Screws 104 connect a ring shaped bushing 106 of L-shaped section around a central opening of wall 102. Wall 102 has a radial rib formation 107 through which fluid passage 108 extends, passage 108 being L-shaped as shown. Cylinder housing 110 is affixed by plural circularly spaced screws 111 extending through surrounding flange 112 to housing 100. Cylinder 110 has cylindrical side wall 115 and end wall 116. A ring shaped formation 117 serves as an end stop for movement of a piston 120 which is affixed around reduced portion 121 of fitting 57a by a split ring 123 disposed in a groove around portion 121.

A bushing 124 in the form of a ring having an L-shaped cross section is affixed around central opening 126 of wall 116 by plural circularly spaced screws 125. Bushing 124 is slidably disposed around portion 54 of shaft 50, as shown. A cylinder housing 130 having cylindrical sidewall 131 and end wall 132 is concentrically screwed at surrounding flange 134 to wall 146 by plural circularly spaced screws 135. Flange 134 is thickened at 134a, and angular shaped passage 138 is formed therethrough leading into the interior of housing 130 to the lefthand side of a piston 139 which is affixed around portion 55 of shaft 50 by washer 141 and split ring 142 disposed in a suitable groove around the shaft. Wall 132 has inlet-outlet fluid passage 144 therethrough.

Piston 86 has seals 150 therearound to prevent fluid leakage therepast in cylinder 82. Piston 120 has seals 152 therearound to prevent fluid leakage therepast in cylinder 110. Piston 139 similarly has seals 154 therearound to prevent fluid leakage therepast in cylinder 130. Additional seals are also provided between other elements of the apparatus, these being indicated by the single reference numeral 156. Seals of any suitable types may be provided at these locations, as will be well understood by those skilled in the art. It will be understood by those skilled in the art that adequate sealing must be provided to prevent fluid pressure leakage from each of the three fluid cylinders utilized in the apparatus.

Clamp 16 is set in the same manner as has been described in connection with clamp 15. Fluid under pressure may be introduced or removed through passage 108 and through passage 108a at the two sides of piston 120. Piston 120 when moved by fluid pressure moves fitting 57a slidably along the shaft 50. This causes movement of ring 46a and toggles 38a to move shafts 30a inwardly or outwardly to bring shoes 32a having pipe engagement pads 33a into or out of clamping engagement with the interior of pipe 11 adjacent its end. Pins 41a are moved to positions 41d in setting of clamp 16.

Ring 160 is affixed to ring 20 by plural circularly spaced screws 161, shown in FIG. 1. Four short pipes or bars 164 of equal length are welded circularly spaced about the periphery of ring 160 to extend parallel to the pipe axis. A ring 160a is welded to the other ends of the pipes 164. A conventional support for the apparatus within a pipe or pipeline is indicated by reference numeral 166. This support apparatus will include wheels for supporting the apparatus in a pipe, of which one or more of the wheels may be driven wheels for propelling the apparatus through a pipe, such support apparatus being well known by those skilled in the art.

At the opposite side of the apparatus, ring 170 is affixed around formation 95 by plural circularly spaced screws 171. Pipes 172, circularly spaced, are welded to plate 170 to extend parallel to the pipe axis. Plate 170a, identical in size with plate 170, is welded to the other ends of pipes 172. Plate 170a is affixed to a device 175, partially shown, which will usually be a support for the apparatus having a nose cone assembly at its righthand end. The nose cone is streamlined at its righthand end, FIG. 1, in order that pipe 11 may be readily introduced thereover as will be described. Device 175 may have support wheels, not shown, for supporting a righthand portion of the apparatus, and will be understood by those skilled in the art.

The apparatus may be used in the following manner: Generally, the apparatus will be disposed within pipe 10 or a pipeline connected to pipe 10, and will be moved through the pipe so that the clamp 15, in retracted condition, is disposed slightly inward of the end of pipe 10. When the apparatus is in this position, the clamp 15 is expanded and set by appropriate delivery of pressured fluid to cylinder 82, at the lefthand side of piston 86. Pipe 11, at this time, will not be place, and clamp 16 will be in retracted condition. After clamp 15 has been set, pipe 11 will be moved over the righthand portion of the apparatus which extends from pipe 10 into abutment with pipe 10. Then, clamp 16 will be expanded and set adjacent the end of pipe 11 by supply of pressured fluid at the righthand side of piston 120. For this purpose, pipe 11 may be supported in any conventional manner, for example, on rollers or by appropriate pipe sling apparatus. After clamp 16 has been set, with the ends of pipes 10 and 11 in abutment one against the other, the cylinder 130 is operated to provide a spacing between the pipe ends. Cylinder 130 is operated by appropriate supply of pressured fluid through passages 138, 144 in customary manner. When piston 139 is moved within cylinder housing 130 by pressure fluid at the righthand side of piston 139, housings 100, 110 and 130 are moved toward the right by the same distance. This causes clamps 15, 16 to be moved farther apart by the same distance. The entire clamp assembly 16 and the cylinder housing 110, 130 are moved toward the right along shaft 50, thereby moving pipe 11 toward the right away from the end of pipe 10.

Figure 2:
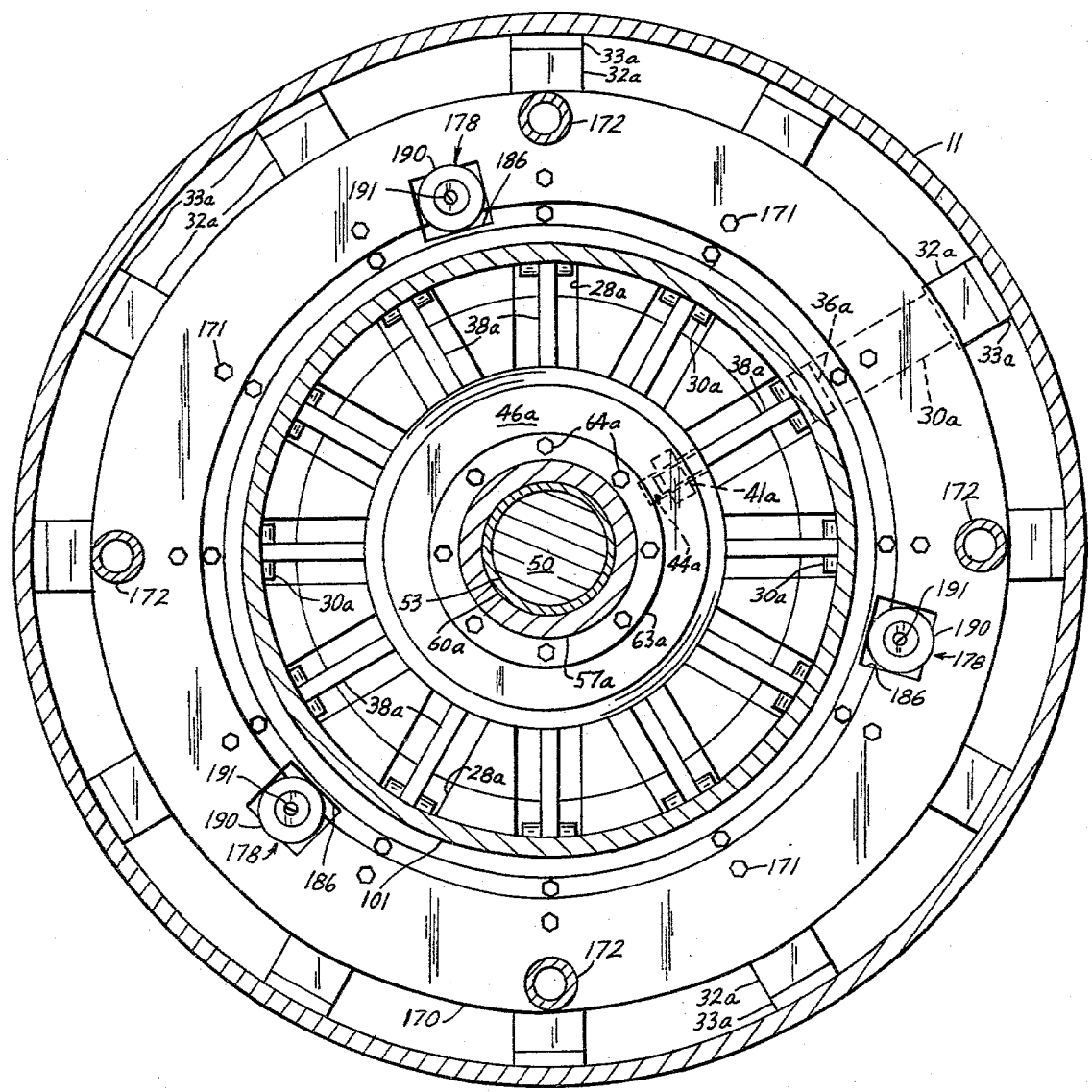
FIG. 2 is a vertical cross section taken at line 2—2 of FIG. 1.
Figure 3:
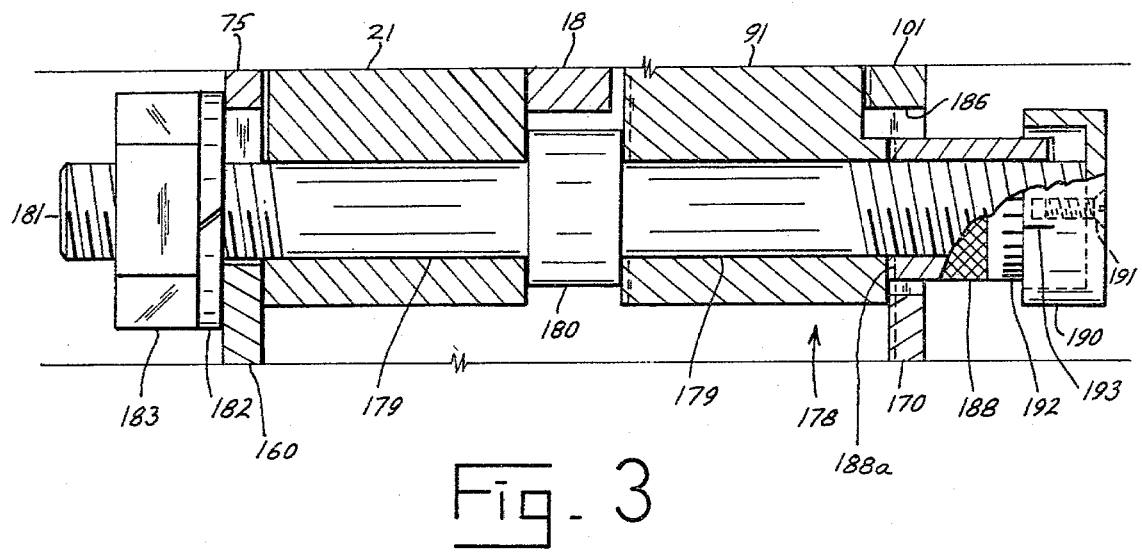
FIG. 3 is an enlarged partial cross section showing an adjustable pipe end spacing control element used in the apparatus.

The extent of movement of piston 139 and the movements of clamps 15, 16 apart are controlled by plural assemblies 178. The assembly 178 shown in FIG. 1 is shown rotatively out of position, and the actual positions of the assemblies 178 are shown in FIG. 2. Each assembly 178, three being shown equally circularly spaced in FIG. 2, includes a shaft 179 having an enlarged integral collar formation 180 therearound, and which is threaded at end 181. Referring now also to FIG. 3 of the drawings, lock washer 182 together with nut 183 fix each shaft 179 through suitable openings through ring 20 and ring or plate 160. Collar 180 is disposed tightly flushly engaged against the righthand side of ring 20, and washer 182 and nut 183 are tightened snugly against the lefthand side of ring 160. Shaft 179 extends through a suitable opening through peripheral formation 95 of plate 91. The righthand end of shaft 179 is threaded, and a pipe end spacing adjustment nut 188 is screwed thereon, nut 188 being knurled therearound so that it may be rotated by hand to set the pipe end spacing. A cap 190 is adjustably fixed to the terminal end of shaft 179 by a screw 191.

The threads by which nut 188 is adjustably fixed to shaft 179 are threads of a strong, hardened, type to be suitably durable for their purpose. To adjust the spacing to be achieved between the ends of pipes 10, 11, nut 188 is rotated on shaft 179 to the desired spacing position spaced from formation 91, indicated by reference numeral 188a in FIG. 3. This same adjustment is made for each of the assemblies 178. The threads of nut 188 and shaft 179 are accurately cut such that a certain rotation of nut 188 on shaft 179 results in a certain spacing between nut 188 and formation 91. Nut 188 has rotation index marks 192 circularly spaced around its righthand end adjacent cap 190. Cap 190 has a single rotation index mark 193 thereon. Before the spacing adjustments of the nuts 188 are made, and with the nuts 188 engaged against formation 91 at equally circularly spaced locations therearound, the caps 190 may be rotated, screws 191 being loosened and retightened for this purpose, so that index marks 193 are at "zero" positions of the index marks 192 of the nuts 188, indicating zero spacing between the ends of pipes 10, 11, which are in abutment at this time. Each nut 188 may then be rotated to bring the desired spacing indication along index marks 192 to the cap index mark 193. This will result in each of the nuts 188 being at the same desired spacing from formation 91, at positions 188a. Then, when piston 139 is moved in cylinder 130, the piston movement, and the movement of the clamps 15, 16 and the ends of pipes 10, 11 apart, will be equal to the spacings preset at the nuts 188. Since the assemblies 178 are located equally circularly spaced around the apparatus, and around the pipe ends, the spacing between the pipe ends is controlled accurately around the full extent of the peripheries of the pipes, this arcuate pipe end spacing being achieved in spite of possible end to end out of line movements of the apparatus components resulting from manufacturing tolerances and wear. Therefore, the apparatus hereby provided is capable of providing accurate pipe end spacings throughout its useful life.

The apparatus which has been described is simple in operation and dependable. The clamps will adequately fix the pipe ends together for welding, and support them during welding, and the pipe end spacing device will accurately move the pipe 11, after clamping thereof, by a predetermined distance from the end of pipe 10. Through use of the apparatus uniform wells of reliable characteristics may be readily obtained continually.

While a preferred embodiment of the apparatus has been described and shown in the drawings, many modifications thereof may be made by a person skilled in the art without departing from the spirit of the invention, and it is intended to protect by Letters Patent all forms of the invention falling within the scope of the following claims.

I claim:

1. Pipe welding clamp, comprising a first clamp assembly comprising a plurality of circularly spaced clamps, means for simultaneously expanding and retracting said clamps of said first clamp assembly, a second clamp assembly comprising a plurality of circularly spaced clamps, means for simultaneously expanding and retracting said clamps of said second clamp assembly, said first and second clamp assemblies being axially spaced and adapted to be separately expanded and set within the ends of first and second pipes disposed end to end, an axial central shaft, said first and second clamp assemblies having respective first and second circular plate means each having an opening through which said axial central shaft is disposed, said first circular plate means being fixed to said axial central shaft whereby said first clamp assembly is fixed against movement along said axial central shaft, said second circular plate means being slidably supported on said axial central shaft whereby said axial central shaft and said first clamp assembly are axially movable with respect to said second clamp assembly, said first and second circular plate means being disposed adjacently in uniformly spaced facing relation on said axial central shaft, drive means adapted to relatively move said first clamp assembly axially in both directions to relatively move a said first pipe in which said first clamp assembly is set axially with respect to said second clamp assembly and a said second pipe in which said second clamp assembly is set, spacing limiting means comprising three circularly spaced spacing shaft means each fixed at one end portion against longitudinal movement through an opening through one of said clamp assemblies and each having its other end portion freely longitudinally slidable through an opening through the other of said clamp assemblies, each of said spacing shaft means having an outwardly projecting collar therearound between said end portions having a predetermined accurate axial thickness and one end of which is flushly disposed against said one of said clamp assemblies and the other end of which provides a gaging surface for engagement by the inner side of said other of said clamp assemblies, each said spacing shaft means having nut means adjustably screwed onto its said other end portion beyond a said opening through which it is freely longitudinally slidably disposed, and including cooperating calibration means on said nut means and on said spacing shaft means for accurately adjusting the distances of said nut means from the outer side of said other of said clamp assemblies to equal selected distances, whereby first and second pipes may be accurately spaced end to end by clamping said first and second pipes abutted end to end with said first and second clamp assemblies and with said other of said clamp assemblies firmly engaged at its inner side with said gaging surfaces of said three outwardly projecting collars whereby said inner side of said other of said clamp assemblies is disposed in a predetermined first plane, and then operating said drive means to move said one of said clamp assemblies by a selected distance limited by the positions of said nut means on said spacing shaft means, said three nut means defining a second plane parallel to said first plane whereby no relative cocking occurs between said clamp assemblies in a said movement of said first clamp assembly away from said second clamp assembly and said pipe ends are thereby accurately uniformly spaced by said selected distance.

2. Pipe welding clamp, comprising a first clamp assembly comprising a plurality of circularly spaced clamps, means for simultaneously expanding and retracting said clamps of said first clamp assembly, a second clamp assembly comprising a plurality of circularly spaced clamps, means for simultaneously expanding and retracting said clamps of said second clamp assembly, said first and second clamp assemblies being axially spaced and adapted to be separately expanded and set within the ends of first and second pipes disposed end to end, an axial central shaft, said first and second clamp assemblies having respective first and second circular plate means each having an opening through which said axial central shaft is disposed, said first circular plate means being fixed to said axial central shaft whereby said first clamp assembly is fixed against movement along said axial central shaft, said second circular plate means being slidably supported on said axial central shaft whereby said axial central shaft and said first clamp assembly are axially movable with respect to said second clamp assembly, said first and second circular plate means being disposed adjacently in uniformly spaced facing relation on said axial central shaft, drive means comprising cylinder means having the piston thereof mounted on said axial central shaft and having the cylinder housing thereof connected directly to said second clamp assembly adapted to act between said axial central shaft and said second clamp assembly for relatively moving said axial central shaft and said first clamp assembly axially in both directions to relatively move a said first pipe in which said first clamp assembly is set axially with respect to said second clamp assembly and a said second pipe in which said second clamp assembly is set, spacing limiting means comprising three circularly spaced spacing shaft means each fixed at one end portion against longitudinal movement through an opening through one of said clamp assemblies and each having its other end portion freely longitudinally slidable through an opening through the other of said clamp assemblies, each of said spacing shaft means having an outwardly projecting collar therearound between said end portions having a predetermined accurate axial thickness and one end of which is flushly disposed against said one of said clamp assemblies and the other end of which provides a gaging surface for engagement by the inner side of said other of said clamp assemblies, each said spacing shaft means having nut means adjustably screwed onto its said other end portion beyond a said opening through which it is freely longitudinally slidably disposed, and including cooperating calibration means on said nut means and on said spacing shaft means for accurately adjusting the distances of said nut means from the outer side of said other of said clamp assemblies to equal selected distances, whereby first and second pipes may be accurately spaced end to end by clamping said first and second pipes abutted end to end with said first and second clamp assemblies and with said other of said clamp assemblies firmly engaged at its inner side with said gaging surfaces of said three outwardly projecting collars whereby said inner side of said other of said clamp assemblies is disposed in a predetermined first plane, and then operating said drive means to move said one of said clamp assemblies relatively away from said other of said clamp assemblies by a selected distance limited by the positions of said nut means on said spacing shaft means, said three nut means defining a second plane parallel to said first plane whereby no relative cocking occurs between said clamp assemblies in said movement of said first clamp assembly away from said second clamp assembly and said pipe ends are thereby accurately uniformly spaced by said selected distance.

3. The combination of claim 2, said spacing shaft means being equally circularly spaced about said apparatus.

4. The combination of claim 2, each said clamp assembly comprising a fitting disposed about said central shaft adapted for sliding movement along said central shaft, stationary means spaced around said fitting carried by one of said plate means having plural circularly spaced radial passages therethrough a reciprocally movable shaft disposed radially through each said passage and being adapted to engage a pipe wall at its outer end, a toggle means pivotally connected between the inner end of each said reciprocally movable shaft and said fitting, movement of said fitting in one direction along said central shaft causing outward movement of said reciprocably movable shafts and movement of said fitting in the opposite direction along said central shaft causing inward movement of said reciprocably movable shafts.

5. The combination of claim 4, including separate fluid cylinder means for moving each said fitting in sliding movement along said axial central shaft in both axial directions thereof.

6. The combination of claim 5, including additional means for limiting the axial movement of said axial central shaft and said first clamp assembly and said spacing between said first and second pipe ends.

7. The combination of claim 4, said spacing shaft means being equally circularly spaced about said apparatus.

8. The combination of claim 2, including means for supporting said apparatus for movement through a pipe.

* * * * *